United States Patent
Deolalikar et al.

(10) Patent No.: US 10,648,322 B2
(45) Date of Patent: *May 12, 2020

(54) SYSTEM AND METHOD FOR DETERMINING DRILLING PARAMETERS BASED ON HYDRAULIC PRESSURE ASSOCIATED WITH A DIRECTIONAL DRILLING SYSTEM

(71) Applicant: Halliburton Energy Services, Inc., Houston, TX (US)

(72) Inventors: Neelesh V. Deolalikar, Webster, TX (US); Daniel Martin Winslow, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 177 days.

This patent is subject to a terminal disclaimer.

(21) Appl. No.: 15/897,715

(22) Filed: Feb. 15, 2018

(65) Prior Publication Data

US 2018/0179884 A1 Jun. 28, 2018

Related U.S. Application Data

(63) Continuation of application No. 14/429,596, filed as application No. PCT/US2012/056547 on Sep. 21, 2012, now Pat. No. 9,920,619.

(51) Int. Cl.
| | |
|---|---|
| *E21B 47/06* | (2012.01) |
| *E21B 7/04* | (2006.01) |
| *E21B 12/02* | (2006.01) |
| *E21B 44/06* | (2006.01) |
| *E21B 49/00* | (2006.01) |
| *G05B 15/02* | (2006.01) |

(52) U.S. Cl.
CPC .............. *E21B 47/06* (2013.01); *E21B 7/04* (2013.01); *E21B 12/02* (2013.01); *E21B 49/003* (2013.01); *G05B 15/02* (2013.01)

(58) Field of Classification Search
CPC ... E21B 47/06; E21B 7/06; E21B 7/04; E21B 49/003
See application file for complete search history.

(56) References Cited

U.S. PATENT DOCUMENTS

| | | |
|---|---|---|
| 5,168,941 A | 12/1992 | Krueger et al. |
| 5,803,185 A | 9/1998 | Barr |
| 7,413,032 B2 | 8/2008 | Krueger |
| 7,556,105 B2 | 7/2009 | Krueger |
| 2008/0164062 A1 | 7/2008 | Brackin et al. |

(Continued)

OTHER PUBLICATIONS

International Search Report and Written Opinion, Application No. PCT/US2012/056547, '9 pages, dated Jan. 2, 2013.

(Continued)

*Primary Examiner* — David J Bagnell
*Assistant Examiner* — Manuel C Portocarrero
(74) *Attorney, Agent, or Firm* — Baker Botts LLP

(57) ABSTRACT

A system and method for determining drilling parameters based on hydraulic pressure associated with a directional drilling system are disclosed. A drilling parameter associated with a directional drilling system may be determined by measuring hydraulic pressure associated with the directional drilling system during drilling of a wellbore, detecting a change in the hydraulic pressure, and determining a drilling parameter based on the detected change in hydraulic pressure.

20 Claims, 5 Drawing Sheets

(56) References Cited

U.S. PATENT DOCUMENTS

| | | |
|---|---|---|
| 2009/0044977 A1 | 2/2009 | Johnson et al. |
| 2010/0133009 A1 | 6/2010 | Carlson et al. |
| 2011/0174541 A1 | 7/2011 | Strachan et al. |

OTHER PUBLICATIONS

Sugiura, Junichi, "Unique Imaging Techniques Optimize Push-the-Bit Borehole Quality," 2009 National Technical Conference & Exhibition, New Orleans, Louisiana, AADE 2009NTCE-14-05, 4 pages, Feb. 2009.

International Preliminary Report on Patentability issued in PCT/US2012/056547; 8 pages, dated Apr. 2, 2015.

Extended European Search Report received for European Application No. 12884908, dated Aug. 29, 2016; 6 pages.

Office Action received for Canadian Application No. 2885500, dated Apr. 20, 2016; 4 pages.

Johnstone, John A., and Hartmut Gruenhagen. "Using rotary closed-loop drilling to increase operational efficiency and reduce operational risk." Offshore Europe. Society of Petroleum Engineers, 2001; 11 pages, Jan. 2001.

Bybee, Karen. "Rotary closed-loop drilling technology meets complex wellbore trajectory challenges." Journal of petroleum technology 52.09 (2000): 41-42; 2 pages, Sep. 1, 2000.

Poli, Sandro, et al. "Advanced tools for advanced wells: rotary closed loop drilling system-results of prototype field testing." SPE drilling & completion 13.02 (1998): 67-72, Jun. 1, 1998.

SYSTEM AND METHOD FOR DETERMINING DRILLING PARAMETERS BASED ON HYDRAULIC PRESSURE ASSOCIATED WITH A DIRECTIONAL DRILLING SYSTEM

RELATED APPLICATIONS

This application is a Continuation of U.S. application Ser. No. 14/429596 filed Mar. 19, 2015, which is a U.S. National Stage Application of International Application No. PCT/US2012/056547 filed Sep. 21, 2012, which designates the United States, and which are incorporated herein by reference in their entirety.

FIELD OF THE DISCLOSURE

The present disclosure is related to downhole drilling tools including, but not limited to, drill bits, sleeves, reamers and bottom-hole assemblies, and more particularly to a system and method for determining drilling parameters based on hydraulic pressure associated with a directional drilling system.

BACKGROUND OF THE DISCLOSURE

Various types of drilling systems including rotary drill bits, reamers, stabilizers and other downhole drilling tools may be used to form a borehole in the earth. Such wellbores are often formed using a rotary drill bit attached to the end of a generally hollow, tubular drill string extending from a well head. Rotation of a rotary drill bit progressively cuts away adjacent portions of a downhole formation using cutting elements and cutting structures disposed on exterior portions of the rotary drill bit. Examples of such rotary drill bits include, but are not limited to, fixed cutter drill bits, drag bits, PDC drill bits, matrix drill bits, roller cone drill bits, rotary cone drill bits and rock bits used in drilling oil and gas wells. Cutting action associated with such drill bits generally uses weight on bit (WOB) and rotation of associated cutting elements into adjacent portions of a downhole formation to push the bit into the formation to cause cutting and drilling. Drilling fluid may also be provided to perform several functions including washing away formation materials and other downhole debris from the bottom of a wellbore, cleaning associated cutting elements and cutting structures and carrying formation cuttings and other downhole debris upward to an associated well surface.

As drilling tools cut into a geological formation, the drilling tools may experience wear and lose efficacy. The amount of wear experienced by a drilling tool may be related to, among other things, the type of formation into which the drilling tool is cutting. For example, the harder the formation, the faster the drilling tool may wear. The increased wear may also cause undue strain on the drill string.

SUMMARY

In accordance with the present disclosure, the disadvantages and problems associated with determining drilling parameters based on hydraulic pressure associated with a directional drilling system have been substantially reduced or eliminated. In one embodiment of the present disclosure, a method of determining a drilling parameter associated with a directional drilling system includes measuring hydraulic pressure associated with a directional drilling system during drilling of a wellbore, detecting a change in the hydraulic pressure, and determining a drilling parameter based on the detected change in hydraulic pressure.

In another embodiment of the present disclosure, a directional drilling system includes a drilling tool including a drill bit and a steering mechanism configured to direct the drill bit in a desired trajectory using hydraulic pressure. The directional drilling system also includes a hydraulic pressure sensor coupled to the steering mechanism and configured to measure the hydraulic pressure. Additionally, the directional drilling equipment is configured to receive the measured hydraulic pressure from the hydraulic pressure sensor, detect a change in the measured hydraulic pressure, and determine a drilling parameter based on the detected change in the measured hydraulic pressure.

In still another embodiment of the present disclosure, directional drilling equipment includes a processor, a computer readable memory communicatively coupled to the processor, and processing instructions encoded in the computer readable memory. The processing instructions, when executed by the processor, are operable to perform operations including: receiving a hydraulic pressure measurement associated with a directional drilling system, detecting a change in the hydraulic pressure measurement, and determining a drilling parameter based on the detected change in the hydraulic pressure measurement.

BRIEF DESCRIPTION OF THE DRAWINGS

A more complete and thorough understanding of the various embodiments and advantages thereof may be acquired by referring to the following description taken in conjunction with the accompanying drawings, wherein.

DETAILED DESCRIPTION

Embodiments of the present disclosure and its advantages are best understood by referring to FIGS. 1 through 8, where like numbers are used to indicate like and corresponding parts.

Figure 1:
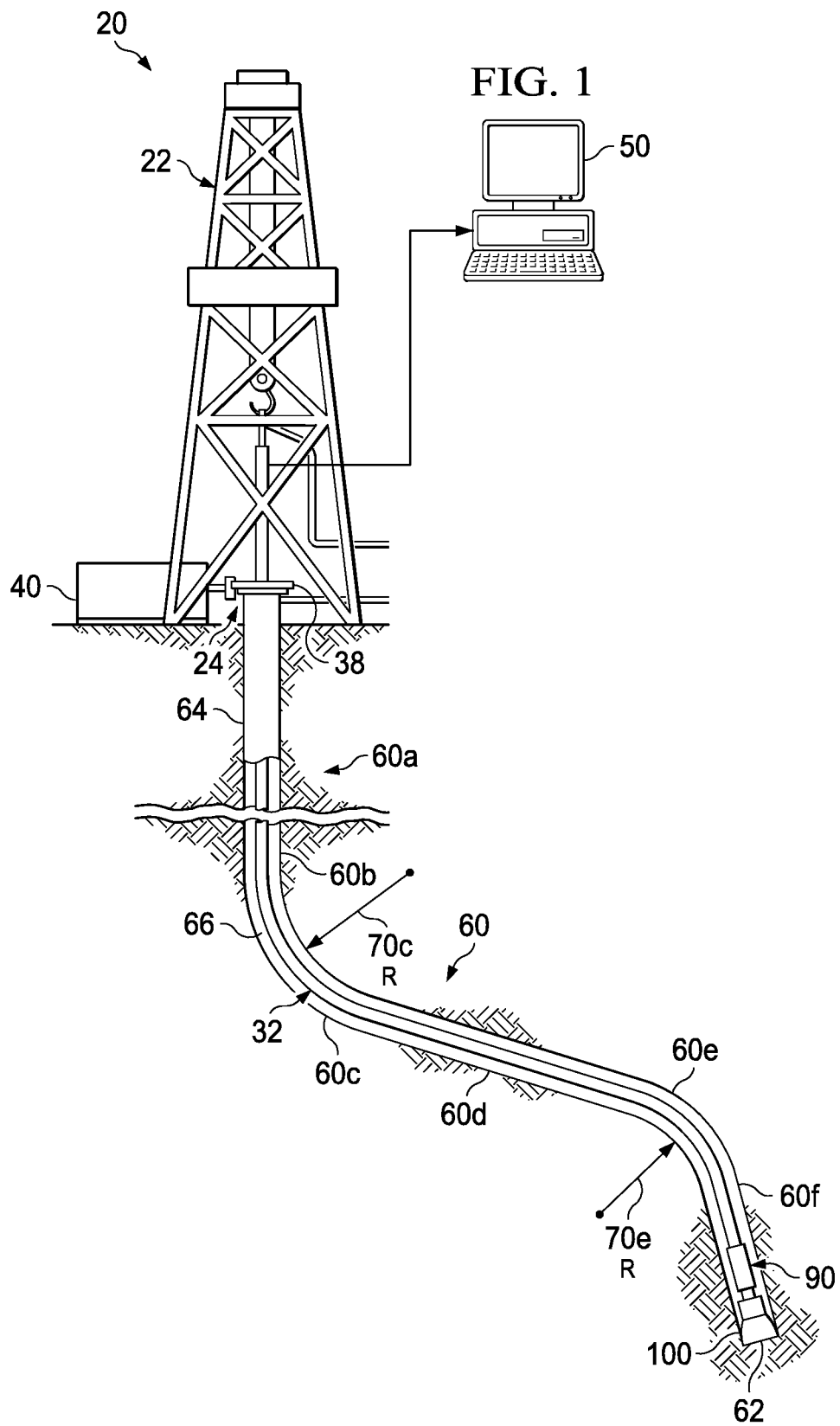
FIG. 1 is an illustration of an example directional drilling system for drilling a wellbore, in accordance with some embodiments of the present disclosure.

FIG. 1 is an illustration of an example directional drilling system 20 for drilling a wellbore 60, in accordance with some embodiments of the present disclosure. Wellbore 60 may include a wide variety of profiles or trajectories such that wellbore 60 may be referred to as a "directional wellbore." As described in further detail below with respect to FIGS. 4-7, a directional wellbore may be formed by applying hydraulic pressure to one or more drilling tools forming the wellbore in order to steer the associated drill bit. The amount of hydraulic pressure may dictate the degree of change in the direction of the drilling tool such that the hydraulic pressure may indicate the trajectory of a directional wellbore. Additionally, the amount of hydraulic pressure used for a certain trajectory may depend on the hardness of the formation being drilled. For example, a formation with a relatively high degree of hardness may require more pressure to achieve a certain trajectory than another formation that has a lower degree of hardness. Further, as cutting elements of a drilling tool wear, more pressure may be required to maintain a specific trajectory. Additionally, cyclic changes in the hydraulic pressure may indicate uneven force distribution along the drilling tool. Therefore, as detailed below, drilling system 20 may be configured to measure the amount of hydraulic pressure being exerted to form a directional wellbore in order to determine drilling parameters including, but not limited to, cutting element wear, drilling characteristics, and/or formation changes. Such hydraulic pressure determinations may improve drilling efficiency by, for example, helping project when to replace a drilling tool (e.g., a drill bit), improving the design of drilling tools, and making modifications to drilling based on formation changes.

Directional drilling system 20 may include land drilling rig 22. However, teachings of the present disclosure may be applied to wellbores using drilling systems associated with offshore platforms, semi-submersible, drill ships and any other drilling system satisfactory for forming a wellbore extending through one or more downhole formations. The terms "downhole" and "uphole" may be used in this application to describe the location of various components of a rotary drill bit relative to portions of the rotary drill bit which engage the bottom or end of a wellbore to remove adjacent formation materials. For example an "uphole" component may be located closer to well head 24 as compared to a "downhole" component, which may be located closer to the bottom or end of wellbore 60.

Drilling rig 22 and associated directional drilling equipment 50 (similar to directional drilling equipment 700 configured to determine changes in hydraulic pressure as described in detail with respect to FIG. 7) may be located proximate well head 24. Drilling rig 22 may also include rotary table 38, rotary drive motor 40 and other equipment associated with rotation of drill string 32 within wellbore 60. Annulus 66 may be formed between the exterior of drill string 32 and the inside diameter of wellbore 60.

Directional drilling system 20 may include various downhole drilling tools and components associated with a measurement while drilling (MWD) system that provides logging data and other information from the bottom of wellbore 60 to directional drilling equipment (not expressly shown). The directional drilling equipment and its associated MWD system may be used to monitor and/or control drilling parameters associated with directional drilling system 20. In some embodiments, the MWD system may be configured to measure the hydraulic pressure used to control the trajectory of drill bit 100, as described in detail with respect to FIGS. 4-7.

Wellbore 60 may be a "directional wellbore" having multiple sections or segments that extend at a desired angle or angles relative to vertical. Some of such angles may be greater than normal variations associated with straight holes. A directional wellbore sometimes may be described as a wellbore deviated from vertical. A directional wellbore may include any combination of "straight hole," "slant hole" and "kick off" portions.

"Straight hole" wellbores or portions may refer to a wellbore or portions of a wellbore that extend at generally a constant angle relative to vertical. Vertical wellbores and horizontal wellbores are examples of straight holes. Most straight holes such as vertical wellbores and horizontal wellbores with any significant length may have some variation from vertical or horizontal based in part on characteristics of associated drilling equipment used to form such wellbores. A slant hole may have similar variations depending upon the length and associated drilling equipment used to form the slant hole.

"Slant hole" wellbores or portions may refer to a straight hole formed at a substantially constant angle relative to vertical. The constant angle of a slant hole may typically be less than ninety degrees (90°) and greater than zero degrees (0°).

"Kick off" portions may refer to a portion or section of a wellbore forming a transition between the end point of a straight hole segment and the first point where a desired dogleg severity or tilt rate is achieved. A kick off segment may be formed as a transition from a vertical wellbore to an equilibrium wellbore with a constant curvature or tilt rate. A kick off segment of a wellbore may have a variable curvature and a variable rate of change in degrees from vertical (variable tilt rate).

Sections, segments and/or portions of a directional wellbore may include, but are not limited to, a vertical section, a kick off section, a building section, a holding section (sometimes referred to as a "tangent section") and/or a dropping section. Vertical sections may have substantially no change in degrees from vertical. Building sections generally have a positive, constant rate of change in degrees. Dropping sections generally have a negative, constant rate of change in degrees. Holding sections such as slant holes or tangent segments and horizontal segments may extend at respective fixed angles relative to vertical and may have substantially zero rate of change in degrees from vertical.

Transition sections formed between straight hole portions of a wellbore may include, but are not limited to, kick off sections, building sections and dropping sections. Such transition sections generally have a rate of change in degrees either greater than or less than zero. The rate of change in degrees may vary along the length of all or portions of a transition section or may be substantially constant along the length of all or portions of the transition section.

A building section having a relatively constant radius and a relatively constant change in degrees from vertical (e.g., constant tilt rate) may be used to form a transition from vertical sections to a slant hole sections or horizontal sections of a wellbore. A dropping section may have a relatively constant radius and a relatively constant change in degrees from vertical (constant tilt rate) may be used to form a transition from a slant hole section or a horizontal section to a vertical section of a wellbore. Building sections and dropping sections may also be described as "equilibrium" sections.

The terms "dogleg severity" or "DLS" may be used to describe the rate of change in degrees of a wellbore from vertical during drilling of the wellbore. DLS is often measured in degrees per one hundred feet (°/100 ft). A straight hole, vertical hole, slant hole or horizontal hole may generally have a value of DLS of approximately zero. DLS may be positive, negative or zero.

Tilt angle (TA) may refer to the angle in degrees from vertical of a segment or portion of a wellbore. A vertical wellbore may have a generally constant tilt angle (TA) approximately equal to zero. A horizontal wellbore may have a generally constant tilt angle (TA) approximately equal to ninety degrees (90°).

Tilt rate (TR) may refer to the rate of change of a wellbore in degrees from vertical per hour of drilling. Tilt rate may also be referred to as "steer rate." Tilt rate may be expressed by the following equation:

$$TR = \frac{d(TA)}{dt}$$

where t=drilling time in hours.

Tilt rate (TR) of a drill bit may also be described as DLS multiplied by rate of penetration (ROP), as expressed by the following equation:

TR=DLS×ROP/100=(degrees/hour)

Tilt rate and tilt angle may be used to plan, evaluate, or execute directional drilling. DLS of respective segments, portions, or sections of a wellbore and corresponding tilt rate may be also used to conduct such planning, evaluation, or execution.

Returning to FIG. 1, as mentioned above, wellbore 60 may generally be described as a directional wellbore or a deviated wellbore having multiple segments or sections. In the illustrated embodiment, section 60a of wellbore 60 may include casing 64 extending from well head 24 to a selected downhole location. Remaining portions of wellbore 60 may be generally described as "open hole" or "uncased."

Wellbore 60 may be generally described as having multiple sections, segments or portions with respective values of DLS. The tilt rate for drill bit 100 during formation of wellbore 60 may be a function of DLS for each segment, section or portion of wellbore 60 multiplied by the ROP for drill bit 100 during formation of the respective segment, section or portion thereof. The tilt rate of drill bit 100 during formation of straight hole sections (e.g., vertical section 60a) may be approximately equal to zero. The DLS capability, and consequently the tilt rate capability, of drilling equipment such as a downhole drilling tool for use in a directional drilling system 20—for example, a tool including drill bit 100—may be affected by the amount of hydraulic pressure used to steer drill bit 100. For example, the greater the pressure, the more a drill bit may attempt to move in certain direction, which may affect the tilt rate. Examples of wellbore segments including different DLS values may be illustrated in sections 60a-60f.

Section 60a extending from well head 24 may be generally described as a vertical, straight hole section with a DLS value approximately equal to zero. When the value of DLS is zero, drill bit 100 may have a tilt rate of approximately zero during formation of the corresponding section of wellbore 60.

A first transition from vertical section 60a may be described as kick off section 60b. For some applications the value of DLS for kick off section 60b may be greater than zero and may vary from the end of vertical section 60a to the beginning of a second transition segment or building section 60c. Building section 60c may be formed with relatively constant radius 70c and a substantially constant value of DLS. Slant hole (or "holding") section 60d may extend from build section 60c opposite from second section 60b. Slant holes section 60d may have a DLS of approximately zero.

Drop section 60e may start at the end of holding section 60d and may have a generally downward looking profile. Drop section 60e may have relatively constant radius 70e. Section 60f may also be a holding section or slant hole section with a DLS of approximately zero. Section 60f as shown in FIG. 1 is being formed by drill bit 100, BHA 90, drill string 32 and associated components of drilling system 20.

Various directional drilling techniques and associated components of BHA 90 may be used to form directional wellbore 60. For example BHA 90 may include a push-the-bit directional drilling system (such as the drilling system described with respect to FIG. 4) or a point-the-bit directional drilling system (such as the drilling system described with respect to FIG. 5).

BHA 90 may be formed from a wide variety of components configured to form wellbore 60. For example, BHA 90 may include, but is not limited to, drill bits (e.g., drill bit 100), drill collars, rotary steering tools, directional drilling tools, downhole drilling motors, reamers, hole enlargers or stabilizers. The number of components such as drill collars and different types of components included with BHA 90 may depend upon anticipated drilling conditions and the type of wellbore that may be formed using drill string 32 and drill bit 100.

BHA 90 may also include various components associated with an MWD system (described below with respect to FIG. 7). These components may include types of well logging tools (not expressly shown) and other downhole drilling tools associated with directional drilling of a wellbore. Examples of such logging tools and/or directional drilling tools may include, but are not limited to, acoustic, neutron, gamma ray, density, photoelectric, nuclear magnetic resonance, rotary steering tools and/or any other commercially available well tool. Further, the MWD system of BHA 90 may include pressure sensors (not expressly shown) configured to measure the amount of hydraulic pressure being used to steer drill bit 100, which may indicate drilling parameters including, but not limited to, cutting element wear, drilling tool performance, drilling direction, drill bit damage, and/or formation changes. Accordingly, the pressure sensors and their associated hydraulic pressure readings may be used to determine drilling parameters such as the wear of cutting elements of drill bit 100 and/or transitions between formation types as mentioned above and further detailed below with respect to FIGS. 7 and 8.

Figure 2A:
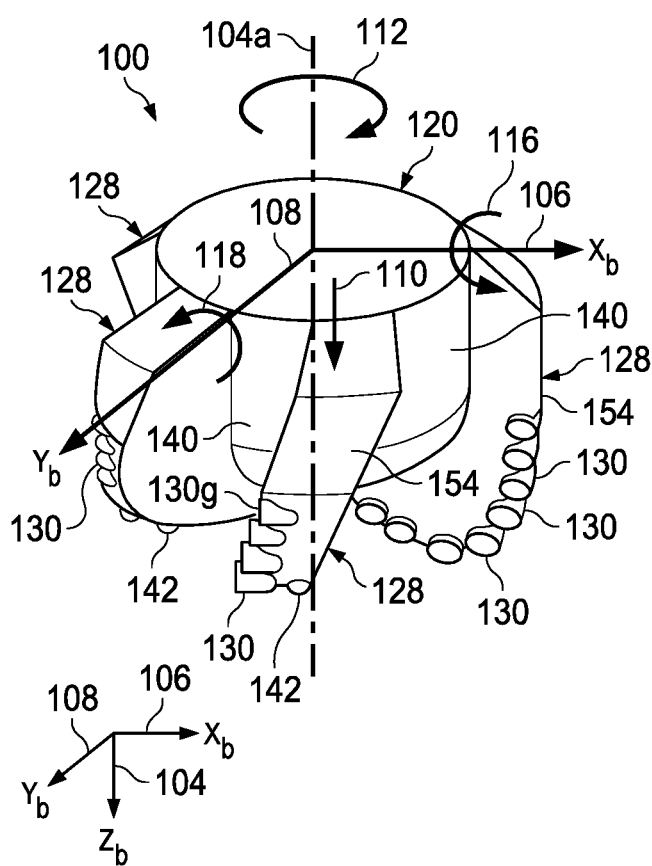
FIG. 2A is a schematic illustration showing an isometric view with portions broken away of a rotary drill bit with six (6) degrees of freedom which may be used to describe motion of the rotary drill bit in three dimensions in a bit coordinate system, in accordance with some embodiments of the present disclosure.

Movement or motion of a drill bit and associated drilling equipment in three dimensions (3D) during formation of a segment, section or portion of a wellbore may be defined by a Cartesian coordinate system (X, Y, and Z axes) and/or a spherical coordinate system (two angles φ and θ and a single radius ρ) in accordance with teachings of the present disclosure. Examples of Cartesian coordinate systems are shown in FIGS. 2A and 3B. The location of downhole drilling equipment or tools and adjacent portions of a wellbore may be translated between a Cartesian coordinate system and a spherical coordinate system.

A Cartesian coordinate system generally includes a Z axis and an X axis and a Y axis that extend normal to each other and normal to the Z axis. See for example FIG. 2A. A Cartesian bit coordinate system may be defined by a Z axis extending along a rotational axis or bit rotational axis of the drill bit. See FIG. 2A. A Cartesian hole coordinate system (sometimes referred to as a "downhole coordinate system" or a "wellbore coordinate system") may be defined by a Z axis extending along a rotational axis of the wellbore. See FIG. 3B. In FIG. 2A the X, Y and Z axes include subscript $_{(b)}$ to indicate a "bit coordinate system." In FIGS. 3A, 3B and 3C the X, Y and Z axes include subscript $_{(h)}$ to indicate a "hole coordinate system."

FIG. 2A is a schematic drawing showing an example drill bit 100. In some embodiments, drill bit 100 may be configured to be used with BHA 90 configured to steer drill bit 100 using hydraulic pressure using a directional drilling system such as a push-the-bit directional drilling system or a point-the-bit directional drilling system, as described below with respect to FIGS. 4 and 5, respectively. Drill bit 100 may include bit body 120 having a plurality of blades 128 formed on bit body 120 with respective junk slots or fluid flow paths 140 formed therebetween. In one embodiment, drill bit 100 may be a rotary drill bit that may be any suitable type of fixed cutter drill bits, drag bits, matrix drill bits, steel body drill bits, roller cone drill bits, rotary cone drill bits and rock bits operable to form a wellbore extending through one or more downhole formations (e.g. wellbore 60). Rotary drill bits and associated components formed may have many different designs, configurations and/or dimensions. A rotary drill bit or other downhole drilling tool may have multiple components, segments or portions. For example, one component of a drill bit may be described as a "cutting face profile" or "bit face profile" responsible for removal of formation materials to form an associated wellbore. For some types of drill bits the "cutting face profile" or "bit face profile" may be further divided into three segments such as "inner cutters or cone cutters," "nose cutters" and/or "shoulder cutters."

Drill bit 100 may include a cutting structure. A cutting structure may include various combinations and arrangements of cutting elements, impact arrestors and/or gage cutters formed on exterior portions of a rotary drill bit and/or sleeve. Some rotary drill bits and/or sleeves may include one or more blades extending from an associated bit body with cutters disposed of the blades. Such blades may also be referred to as "cutter blades." Various configurations of blades and cutters may be used to form cutting structures for a rotary drill bit and/or sleeve.

In the illustrated embodiment, the cutting structure associated with drill bit 100 may include a plurality of cutting elements 130 disposed on the exterior portions of each blade 128. Cutting elements 130 may be any suitable type of cutters, compacts, buttons, inserts and gage cutters satisfactory for use with a wide variety of drill bits. Impact arrestors 142 may be included as part of the cutting structure on some types of rotary drill bits and may sometimes function as cutting elements to remove formation materials from adjacent portions of a wellbore. Polycrystalline diamond compacts (PDC) and tungsten carbide inserts are often used to form cutting elements or cutters. Various types of other hard, abrasive materials may also be satisfactorily used to form cutting elements or cutters.

Figure 2B:
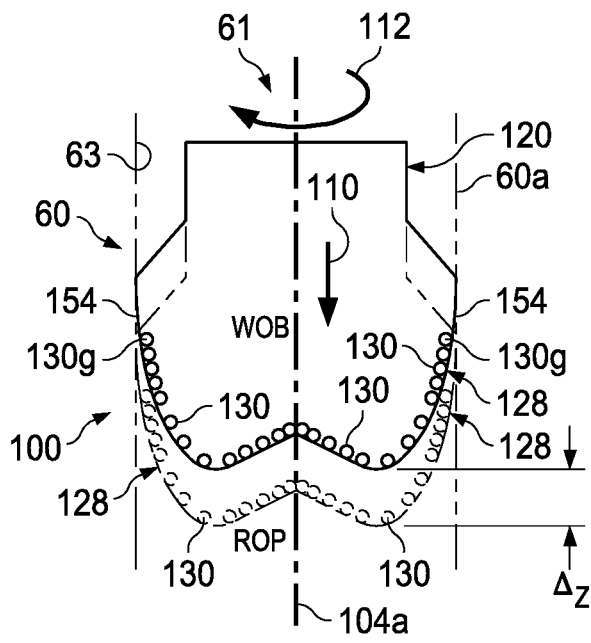
FIG. 2B is a schematic illustration showing forces applied to a rotary drill bit while forming a substantially vertical wellbore, in accordance with some embodiments of the present disclosure.

Drill bit 100 may translate linearly relative to the X, Y and Z axes as shown in FIG. 2A (three (3) degrees of freedom). Drill bit 100 may also rotate relative to the X, Y and Z axes (three (3) additional degrees of freedom). As a result, movement of drill bit 100 relative to the X, Y and Z axes as shown in FIGS. 2A and 2B, drill bit 100 may be described as having six (6) degrees of freedom. During drilling, these parameters may be expressed by WOB, bit side forces, RPM, ROP, DLS, bend length ($B_L$) and azimuth angle of an associated tilt plane. Thus, factors that affect WOB and/or DLS in turn affect the movement of drill bit 100.

Referring back to FIG. 1, when sufficient force from drill string 32 has been applied to drill bit 100, cutting elements 130 may engage and remove adjacent portions of a downhole formation at bottom hole or end 62 of wellbore 60. Removing such formation materials may allow downhole drilling equipment including drill bit 100 and associated drill string 32 to move linearly relative to adjacent portions of wellbore 60.

Various kinematic parameters associated with forming a wellbore using a drill bit may be based upon RPM and ROP of the drill bit into adjacent portions of a downhole formation. Arrow 110 in FIG. 2A may be used to represent forces which move drill bit 100 linearly relative to rotational axis 104a. Such linear forces typically result from weight applied to drill bit 100 by drill string 32, resulting in WOB. If there is no weight on drill bit 100, no axial penetration may occur at end or bottom hole 62 of wellbore 60.

Rotational force 112 may be applied to drill bit 100 by rotation of drill string 32. RPM of drill bit 100 may be a function of rotational force 112. Rotation speed of drill bit 100 is generally defined relative to the rotational axis of drill bit 100 which corresponds with Z axis 104.

Arrow 116 indicates rotational forces which may be applied to drill bit 100 relative to X axis 106. Arrow 118 indicates rotational forces which may be applied to drill bit 100 relative to Y axis 108. Rotational forces 116 and 118 may result from interaction between cutting elements 130 disposed on exterior portions of drill bit 100 and adjacent portions of bottom hole 62 during the forming of wellbore 60. Rotational forces applied to drill bit 100 along X axis 106 and Y axis 108 may result in tilting of drill bit 100 relative to adjacent portions of drill string 32 and wellbore 60.

FIG. 2B is a schematic drawing of drill bit 100 disposed within vertical section or straight hole section 60a of wellbore 60. During the drilling of a vertical section or any other straight hole section of a wellbore, the bit rotational axis of drill bit 100 may generally be aligned with a corresponding rotational axis of the straight hole section. The incremental change or the incremental movement of drill bit 100 in a linear direction during a single revolution may be represented by ΔZ in FIG. 2B.

Rate of penetration of a drill bit is typically a function of both WOB and RPM. For some applications a downhole motor (not expressly shown) may be provided as part of BHA 90 to also rotate drill bit 100. The ROP of a drill bit is generally stated in feet per hour.

The axial penetration of drill bit 100 may be defined relative to bit rotational axis 104a in an associated bit coordinate system. An equivalent side penetration rate or lateral penetration rate due to tilt motion of drill bit 100 may be defined relative to an associated hole coordinate system. Examples of a hole coordinate system are shown in FIGS. 3A, 3B and 3C.

Figure 3A:
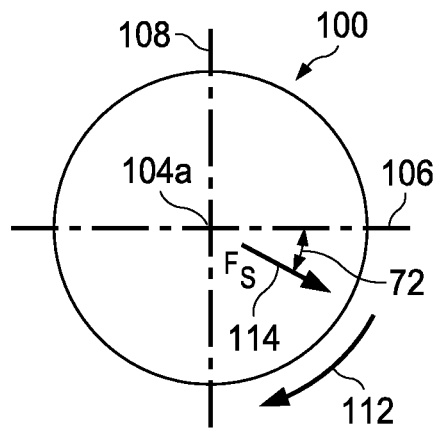
FIG. 3A is a schematic illustration showing a side force applied to a rotary drill bit at an instant in time, in accordance with some embodiments of the present disclosure.
Figure 3B:
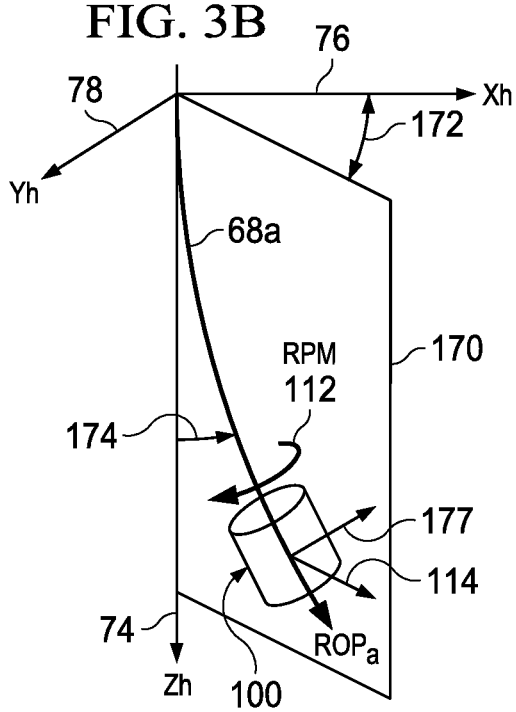
FIG. 3B is a schematic illustration showing a trajectory of a directional wellbore and a rotary drill bit disposed in a tilt plane at an instant of time in a three dimensional Cartesian hole coordinate system, in accordance with some embodiments of the present disclosure.
Figure 3C:
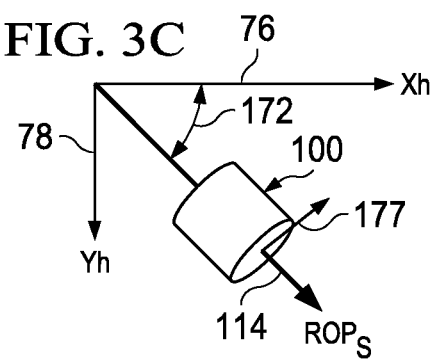
FIG. 3C is a schematic illustration showing the rotary drill bit of FIG. 3B at the same instant of time in a two dimensional Cartesian hole coordinate system, in accordance with some embodiments of the present disclosure.

FIGS. 3A, 3B and 3C are graphical representations of various kinematic parameters which may be satisfactorily used to model or simulate drilling segments or portions of a wellbore having a value of DLS greater than zero. FIG. 3A is a schematic illustration showing a side force 114 applied to rotary drill bit 100 at an instant in time, in accordance with some embodiments of the present disclosure. FIG. 3A shows a schematic cross-section of drill bit 100 in two dimensions relative to a Cartesian bit coordinate system. The bit coordinate system is defined in part by X axis 106 and Y axis 108 extending from bit rotational axis 104a. FIG. 3B is a schematic illustration showing a trajectory of a directional wellbore and rotary drill bit 100 disposed in a tilt plane at an instant of time in a three dimensional Cartesian hole coordinate system, in accordance with some embodiments of the present disclosure. FIG. 3C is a schematic illustration showing rotary drill bit 100 of FIG. 3B at the same instant of time in a two dimensional Cartesian hole coordinate system. FIGS. 3B and 3C show graphical representations of drill bit 100 during drilling of a transition segment such as kick off segment 60b of wellbore 60 in a Cartesian hole coordinate system defined in part by Z axis 74, X axis 76 and Y axis 78.

A side force is generally applied to a drill bit by an associated directional drilling system to form a wellbore having a desired profile or trajectory using the drill bit. For a given set of drilling equipment design parameters and a given set of downhole drilling conditions, a respective side force must be applied to an associated drill bit to achieve a desired DLS or tilt rate.

FIG. 3A shows side force 114 extending at angle 72 relative to X axis 106. Side force 114 may be applied to drill bit 100 by directional drilling system 20. Angle 72 (sometimes referred to as an "azimuth" angle) extends from rotational axis 104a of drill bit 100 and represents the angle at which side force 114 may be applied to drill bit 100. For some applications side force 114 may be applied to drill bit 100 at a relatively constant azimuth angle.

Figure 4:
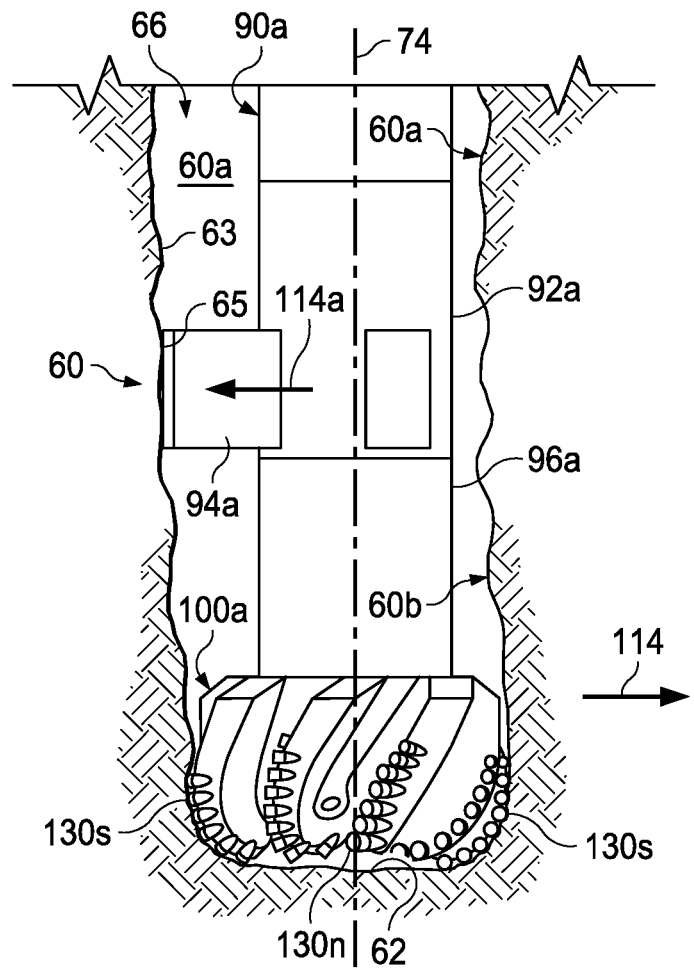
FIG. 4 illustrates aspects of push-the-bit directional drilling systems that may be used in accordance with some embodiments of the present disclosure.
Figure 5:
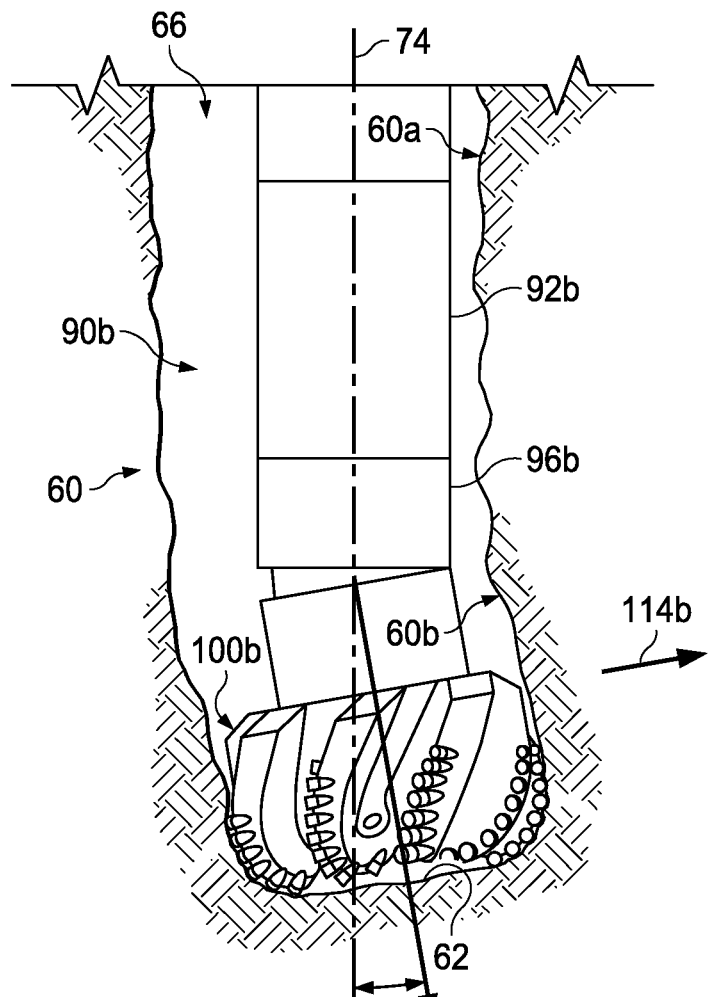
FIG. 5 illustrates aspects of point-the-bit directional drilling systems that may be used in accordance with some embodiments of the present disclosure.

Directional drilling systems such as drill bit steering unit 92a shown in FIG. 4 and drill bit steering unit 92b shown in FIG. 5, may be used to either vary the amount of side force 114 or to maintain a relatively constant amount of side force 114 applied to drill bit 100. Directional drilling systems may also vary the azimuth angle at which a side force is applied to a drill bit to correspond with a desired wellbore trajectory or drill path. In one embodiment, the amount of side force 114 required to achieve a desired DLS or the ability to select a particular an azimuth angle may depend upon a variety of factors, including, but not limited to, bit wear and formation hardness.

During drilling of straight hole segments of wellbore 60, side forces applied to drill bit 100 may be substantially minimized (approximately zero side forces) or may be balanced such that the resultant value of any side forces may be approximately zero. Straight hole segments of wellbore 60 as shown in FIG. 1 include, but are not limited to, vertical section 60a, holding section or slant hole section 60d, and holding section or slant hole section 60f During formation of straight hole segments of wellbore 60, the primary direction of movement or translation of drill bit 100 may be generally linear relative to an associated longitudinal axis of the respective wellbore segment and relative to associated bit rotational axis 104a.

During the drilling of portions of wellbore 60 having a DLS with a value greater than zero or less than zero, a side force ($F_s$) or equivalent side force may be applied to an associated drill bit to cause formation of corresponding wellbore segments 60b, 60c and 60e. For some applications such as when a push-the-bit directional drilling system is used with a drill bit, an applied side force may result in a combination of bit tilting and side cutting or lateral penetration of adjacent portions of a wellbore. For other applications such as when a point-the-bit directional drilling system is used with an associated drill bit, side cutting or lateral penetration may generally be small or may not even occur. When a point-the-bit directional drilling system is used with a drill bit, directional portions of a wellbore may be formed primarily as a result of bit penetration along an associated bit rotational axis and tilting of the drill bit relative to a wellbore axis. An example of operation of a push-the-bit directional drilling system is shown in FIG. 4 below and an example of a point-the-bit directional drilling system is shown in FIG. 5 below.

Side force 114 may be adjusted or varied to cause associated cutting elements 130 to engage adjacent portions of a downhole formation so that drill bit 100 may follow profile or trajectory 68a, as shown in FIG. 3B, or any other desired profile. Respective tilting angles of drill bit 100 may vary along the length of trajectory 68a. Arrow 174 corresponds with the variable tilt rate of drill bit 100 relative to vertical at any one location along trajectory 68a. During movement of drill bit 100 along profile or trajectory 68a, the respective tilt angle at each location on trajectory 68a may generally increase relative to Z axis 74 of the hole coordinate system shown in FIG. 3B. For embodiments such as shown in FIG. 3B, the tilt angle at each point on trajectory 68a may be approximately equal to an angle formed by a respective tangent extending from the point in question and intersecting Z axis 74. Therefore, the tilt rate may also vary along the length of trajectory 168.

During the formation of kick off segment 60b and any other portions of a wellbore in which the value of DLS is either greater than zero or less than zero and is not constant, drill bit 100 may experience side cutting motion, bit tilting motion and axial penetration in a direction associated with cutting or removing of formation materials from the end or bottom of a wellbore.

For embodiments as shown in FIGS. 3A, 3B and 3C directional drilling system 20 may cause drill bit 100 to move in the same azimuth plane 170 during formation of kick off segment 60b. FIGS. 3B and 3C show relatively constant azimuth plane angle 172 relative to the X axis 76 and Y axis 78. Arrow 114 as shown in FIG. 3A represents a side force applied to drill bit 100 by directional drilling system 20. Arrow 114 may generally extend normal to rotational axis 104a of drill bit 100. Arrow 114 may also be disposed in tilt plane 170. A side force applied to a drill bit in a tilt plane by an associate drill bit steering unit or directional drilling system may also be referred to as a "steer force."

During the formation of a directional wellbore such as shown in FIG. 3B, without consideration of bit walk, rotational axis 104a of drill bit 100 and a longitudinal axis of BHA 90 may generally lie in tilt plane 170. Drill bit 100 may experience tilting motion in tilt plane 170 while rotating relative to rotational axis 104a. Tilting motion may result from a side force or steer force applied to drill bit 100 by a directional steering unit. Tilting motion often results from a combination of side forces and/or axial forces applied to drill bit 100 by directional drilling system 20.

In both point-the-bit and push-the-bit directional drilling systems, side force 114 may be a result of hydraulics used to steer drill bit 100 in the desired direction. Accordingly, the amount of hydraulic pressure applied may relate to the tilt rate of drill bit 100. Additionally, as cutting elements 130 of drill bit 100 wear from cutting into the formation, a greater amount of hydraulic pressure may be required to achieve the same amount of tilt and tilt rate. Further, the hydraulic pressure may be adjusted while transitioning between formations having different degrees of hardness to maintain substantially the same tilt rate. Additionally, cyclic changes in the hydraulic pressure may indicate inconsistent cutting by drill bit 100. Therefore, the hydraulic pressure may indicate drilling parameters such as, but not limited to cutting element wear, drilling tool performance, transitions from one formation type to another, and/or formation tendencies (e.g., the direction the drilling tool may be steered to overcome the dip angle of the formation).

FIG. 4 illustrates aspects of push-the-bit directional drilling systems that may be used in accordance with embodiments of the present disclosure. FIG. 4 shows portions of BHA 90 a disposed in generally vertical portion 60a of wellbore 60 as rotary drill bit 100a begins to form kick off segment 60b. BHA 90 a may include rotary drill bit steering unit 92a operable to apply side force 114 to rotary drill bit 100a. Steering unit 92 a may be one portion of a push-the-bit directional drilling system or rotary steerable system (RSS).

In many push-the-bit RSS, a number of expandable thrust pads may be located a selected distance above an associated rotary drill bit. Expandable thrust pads may be used to bias the rotary drill bit along a desired trajectory. Several steering mechanisms may be used, but push-the-bit principles are generally the same. A side force is applied to the bit by the RSS from a fulcrum point disposed uphole from the RSS. As mentioned above, the side force may be applied using hydraulic pressure. Rotary drill bits used with push-the-bit RSS typically have a short gage pad length in order to satisfactorily steer the bit. Near bit stabilizers or sleeves are generally not used with push-the-bit RSS.

Push-the-bit systems may generally include simultaneous axial penetration and side penetration in order to drill directionally. Bit motion associated with push-the-bit directional drilling systems is often a combination of axial bit penetration, bit rotation, bit side cutting and bit tilting.

In the illustrated embodiment, steering unit 92a may extend one or more arms or thrust pads 94a to apply force 114a to adjacent portions of wellbore 60 and maintain desired contact between steering unit 92a and adjacent portions of wellbore 60. Side forces 114 and 114a may be approximately equal to each other. If there is no weight on rotary drill bit 100a, no axial penetration may occur at end or bottom hole 62 of wellbore 60. Side cutting may generally occur as portions of rotary drill bit 100a engage and remove adjacent portions of wellbore 60a.

Steering unit 92a may extend thrust pads 94a to apply side force 114a using a hydraulic system that applies hydraulic pressure to thrust pads 94a. Therefore, as the hydraulic pressure increases, side force 114a may increase. As mentioned above, the amount of side force 114a required to steer drill bit 100a at a certain tilt rate may be based at least partially on the wear of cutting elements 130 of drill bit 100a and the hardness of the formation being drilled. Therefore, the hydraulic pressure may be used to determine cutting element wear and/or formation changes, among other drilling parameters. Therefore, a push-the-bit system, such as described above with respect to FIG. 4 may be used to create a directional wellbore such as directional wellbore 60. Additionally, as described above, hydraulic pressure used to create side forces may be measured to determine drilling parameters including, but not limited to, cutting element wear, drilling tool performance, and/or formation changes.

FIG. 5 illustrates aspects of point-the-bit directional drilling systems that may be used in accordance with some embodiments of the present disclosure. Point-the-bit directional drilling systems such as shown in FIG. 5 may generally create of a fulcrum point between an associated bit cutting structure or bit face profile and associated point-the-bit rotary steering system. The fulcrum point may be formed by a stabilizer or a sleeve disposed uphole from the associated rotary drill bit.

FIG. 5 shows portions of BHA 90b disposed in a generally vertical section of wellbore 60a as rotary drill bit 100b begins to form kick off segment 60b. BHA 90b includes rotary drill bit steering unit 92b which may provide one portion of a point-the-bit directional drilling system. A point-the-bit directional drilling system may generate a deflection which deforms portions of an associated drill string to direct an associated drill bit in a desired trajectory. There are several steering or deflection mechanisms associated with point-the-bit rotary steering systems. A common feature of point-the-bit RSS is often a deflection angle generated between the rotational axis of an associated rotary drill bit and longitudinal axis of an associated wellbore.

In some point-the-bit directional drilling systems the deflection mechanisms may create the deflection angle using hydraulic pressure. Therefore, as the hydraulic pressure increases, side force 114b caused by drill bit 100b may increase. As mentioned above, the amount of side force 114b required to steer drill bit 100b at a certain tilt rate may be based at least partially on the wear of cutting elements 130 of drill bit 100b and the hardness of the formation being drilled. Therefore, the hydraulic pressure may be used to determine cutting element wear and/or formation changes among other drilling parameters.

Point-the-bit directional drilling systems may form a directional wellbore using a combination of axial bit penetration, bit rotation and bit tilting. Point-the-bit directional drilling systems may not produce side penetration in as high a magnitude as, for example, push-the-bit direction steering systems such as steering unit 92a in FIG. 4. One example of a point-the-bit directional drilling system is the Geo-Pilot® Rotary Steerable System available from Sperry Drilling Services at Halliburton Company.

Therefore, a point-the-bit system, such as described above with respect to FIG. 5 may be used to create a directional wellbore such as directional wellbore 60. Additionally, as described above, hydraulic pressure used to deflect the drill bit and create side forces may be measured to determine drilling parameters including, but not limited to, cutting element wear, drilling tool performance and/or formation changes.

Figure 6:
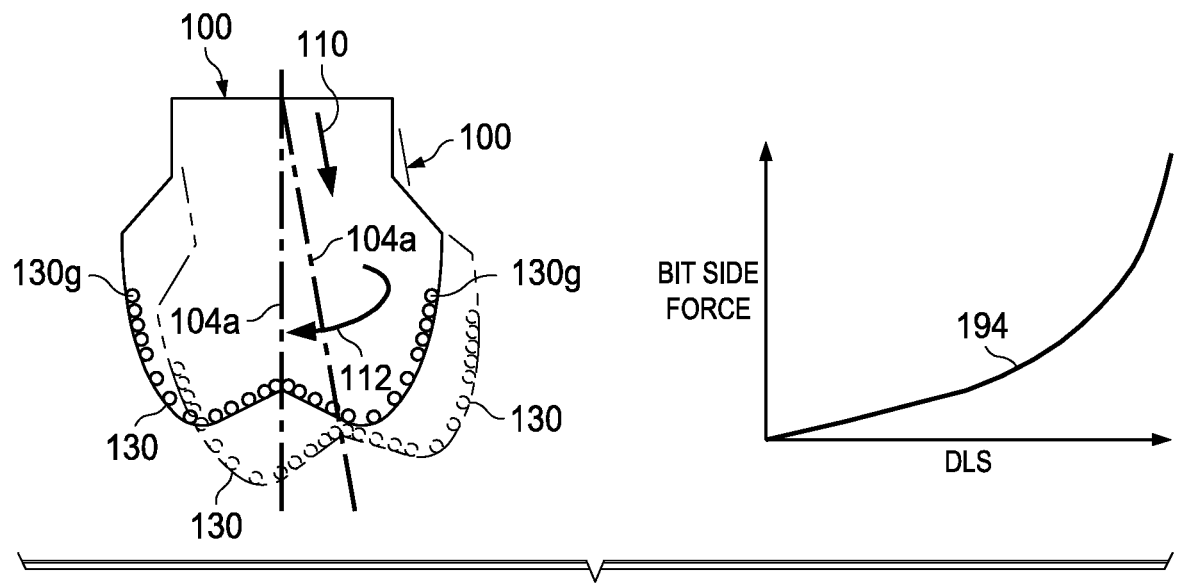
FIG. 6 is a schematic illustration of a rotary drill bit showing changes in bit side forces with respect to changes in dog leg severity (DLS) during drilling of a directional wellbore, in accordance with some embodiments of the present disclosure.

FIG. 6 is a schematic illustration of rotary drill bit 100 showing changes in bit side forces with respect to changes in dog leg severity (DLS) during drilling of a directional wellbore, in accordance with some embodiments of the present disclosure. FIG. 6 is a schematic drawing showing drill bit 100 in solid lines in a first position associated with forming a generally vertical section of a wellbore. Drill bit 100 is also shown in dotted lines in FIG. 6 showing a directional portion of a wellbore such as kick off segment 60a. The graph shown in FIG. 6 indicates that the amount of bit side force required to produce a tilt rate corresponding with the associated DLS may generally increase as the dogleg severity of the deviated wellbore increases. The shape of curve 194 as shown in FIG. 6 may be a function of downhole drilling tool design parameters and/or associated downhole drilling conditions. For example, the hydraulic force used to steer a drill bit may impact the and consequently impact the ability to drill a wellbore.

Figure 7:
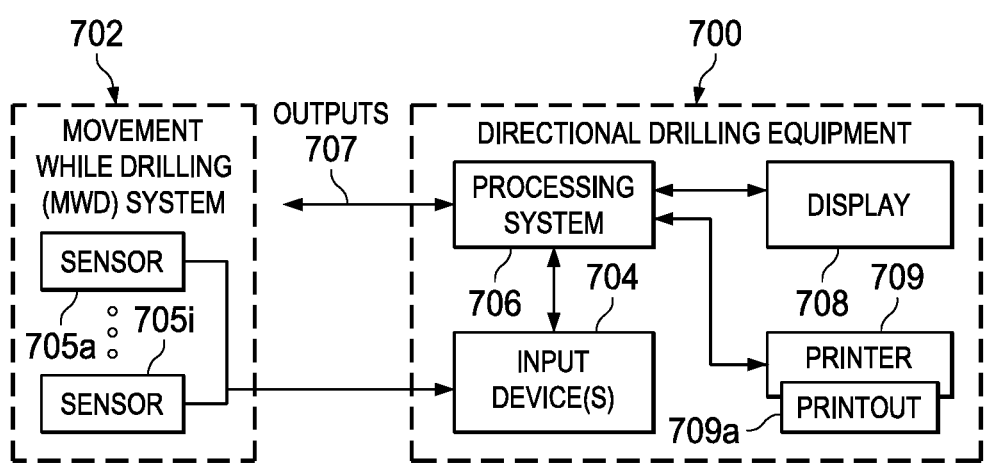
FIG. 7 is an example illustration of a block diagram of directional drilling equipment and an associated measurement while drilling (MWD) system, in accordance with some embodiments of the present disclosure.

FIG. 7 illustrates a block diagram of an example of directional drilling equipment 700 and an associated MWD system 702. MWD system 702 may include one or more sensors 705a-705i located along a drill string (e.g., drill string 32 of FIG. 1) that may be configured to measure a variety of parameters associated with drilling that may be used for well logging. In some embodiments, one or more of sensors 705a-705i may be disposed at various locations along a bottom hole assembly such as BHA 90 described above with respect to FIG. 1.

Sensors 705a-705i may be configured to measure any number of parameters associated with drilling into a formation, including, but not limited to, porosity, rock strength, resistivity, density and direction changes. Sensors 705a-705i may measure these parameters using any suitable methods and may be any one of acoustic, neutron, gamma ray, density, photoelectric, and nuclear magnetic resonance tools.

Further, according to embodiments of the present disclosure, sensors 705a-705i may include one or more hydraulic pressure sensors configured to measure hydraulic pressure used to steer a drill bit (e.g., drill bit 100 of FIGS. 1-5C). The hydraulic pressure sensors may be, for example, a strain gage, a quartz transducer pressure sensor, or any other suitable hydraulic pressure sensor. The placement of the hydraulic pressure sensors may vary according to the particular sensor type, but in some embodiments, the hydraulic pressure sensors may be placed in-line with a hydraulic control circuit or fluidly coupled with the hydraulic control circuit.

As mentioned above, the hydraulic pressure used to steer a drill bit may indicate drilling parameters including, but not limited to, wear associated with cutting elements, drilling tool performance and/or formation changes. Accordingly, one or more hydraulic pressure sensors that may be included with sensors 705a-705i may provide information indicative of one or more drilling parameters.

Sensors 705a-705i of MWD system 702 may be communicatively coupled to one or more input devices 704 of directional drilling equipment 700 such that directional drilling equipment 700 may receive logging data and other information (including hydraulic pressure) gathered by MWD system 702.

Input device 704 may direct the data received from MWD system 702 to a data processing system 706. Data processing system 706 may include a processor coupled to a memory. The processor may comprise, for example a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in the memory. Such program instructions or process data may constitute portions of software for carrying out simulation, monitoring, or control of the directional drilling described herein. The memory may include any system, device, or apparatus configured to hold and/or house one or more memory modules; for example, the memory may include read-only memory, random access memory, solid state memory, or disk-based memory. Each memory module may include any system, device or apparatus configured to retain program instructions and/or data for a period of time (e.g., computer-readable non-transitory media).

In some embodiments, data processing system 706 may be configured to determine changes in hydraulic pressure as measured by one or more sensors 705a-705i. Based on the changes in hydraulic pressure and other data being measured by MWD system 702, data processing system 706 may determine drilling parameters including, but not limited to, information related to cutting element wear, drilling tool performance and/or a change in the formation being drilled.

For example, as indicated above, some directional drilling systems may have a fixed oil volume pressure that may be related to the side force being exerted by the bit. In other directional drilling systems, the hydraulic pressure may be dynamically changed during drilling based on feedback systems indicating trajectory and such. As the cutting elements of a drilling tool (e.g., drill bit) wear during drilling, the side force may increase, which may result in an increase in the hydraulic pressure. Typically, a the cutting elements of a drilling tool may gradually wear as drilling occurs, therefore, by monitoring a relatively gradual increase in hydraulic pressure, it may be determined that the cutting elements of a drilling tool (e.g., drill bit) may be experiencing increased wear. Additionally, in some instances where back up cutting elements are included on a drilling tool, a decrease in hydraulic pressure (after an increase in the pressure due to wear on the primary cutting elements) may indicate that relatively unworn backup cutting elements may have begun engaging the formation.

Further, a change from one formation to another formation may also result in a change in side force based on differences in the hardness between the formations. In some instances, the change from one formation to another may be abrupt, such that a relatively fast change in hydraulic pressure may indicate that a formation change has occurred instead of indicating wear on the cutting elements of the drill bit. In other words, a high rate of pressure change may indicate an abrupt change in formation, while a low rate of pressure change may indicate wear on the cutting elements of the drill bit. In the same or alternative embodiments, a determination that a change in the hydraulic pressure is due to a formation change may be verified with other measurements taken by MWD system 702, such as porosity, rock strength, resistivity, density etc. Additionally, measurements may be made by wire-line system of an offset well that is close in proximity to the subject well.

Additionally, the hydraulic pressure measurements may indicate drill bit performance. For example, a cyclic change in hydraulic pressure may indicate that some sections of the drill bit are engaging and cutting into the formation more effectively than other areas. Accordingly, by using these cyclic changes, one or more design changes may be made to the drill bit to improve the overall engagement of the bit with a formation. Furthermore, the hydraulic pressure measurements may indicate performance of the drilling system in the wellbore. For example, the measurements may be used to adjust the fluid flow rate in the wellbore, drill string speed, steering direction of the drilling system, and the WOB in order to improve drilling performance.

Processing system 706 may be communicatively coupled to various displays 708 that are part of directional drilling equipment 700 such that information processed by processing system 706 (e.g., cutting element wear, formation changes, drilling tool performance, etc.) may be conveyed to operators of directional drilling equipment 700. Printer 709 and associated printouts 709a may also be used to report the performance of the associated drill string, BHA and drill bit (e.g., drilling string 32, BHA 90 and associated drill bit 100, as shown in FIG. 1.) Outputs 707 may be communicated to various components associated with operating the associated drilling rig (e.g., drilling rig 22), to various remote locations to monitor and/or control the performance of the directional drilling system (e.g., directional drilling system 20), or to users simulating the drilling of the wellbore, (e.g., wellbore 60).

Accordingly, by measuring and analyzing hydraulic pressure measurements provided by one or more sensors 705 of MWD system 702, directional drilling equipment 700 and MWD system 702 may be used to determine drilling parameters that may be dependent on the hydraulic pressure used in directional drilling systems. Some of the various parameters indicated by hydraulic pressure may be cutting element wear, formation changes, drilling tool performance etc. Therefore, MWD system 702 and directional drilling equipment 700 may provide and process hydraulic pressure information that may help improve drilling efficiency.

Modifications, additions, or omissions may be made to FIG. 7 without departing from the scope of the present disclosure. For example, the number of sensors 705 and the parameters measured by sensors 705 may vary depending on the drilling application. Further, other drilling parameters may be determined based on the hydraulic pressure of a directional drilling system.

Figure 8:
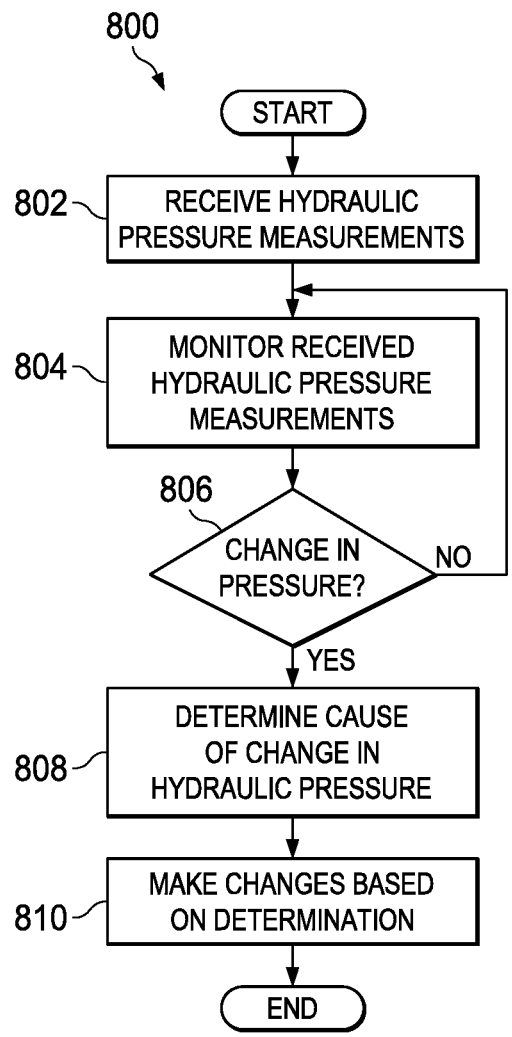
FIG. 8 is a flow chart of an example method for determining drilling parameters based on hydraulic pressure, in accordance with some embodiments of the present disclosure.

FIG. 8 is an illustration of an example method 800 for determining drilling parameters based on hydraulic pressure. Method 800 may be performed by any suitable system, apparatus, or device. As an example method 800 is described as being performed by processing system 706 described with respect to FIG. 7, however, any other suitable system, apparatus or device may be used.

Method 800 may start, and at step 802 processing system 706 may receive hydraulic pressure measurements from one or more hydraulic pressure sensors of sensors 705a-705i included in MWD system 702. As mentioned above, one or more of sensors 705a-705i may be configured to measure hydraulic pressure used to steer a drill bit in a directional drilling system such as a point-the-bit drilling system or a push-the-bit drilling system. At step 804, processing system 706 may monitor the received hydraulic pressure measurements. At step 806, processing system 706 may determine whether or not a change in the hydraulic pressure has occurred based on the monitored hydraulic pressure measurements. If a change in hydraulic pressure has not occurred, method 800 may return to step 804, otherwise, method 800 may proceed to step 808.

At step 808, processing system 706 may determine a cause in the change of the hydraulic pressure. For example, as explained above with respect to FIG. 7, if an upward change in hydraulic pressure is relatively gradual, the change may indicate cutting element wear of a drilling tool (e.g. a drill bit). A gradual increase in pressure and then a decrease in pressure may indicate that secondary cutting elements have now engaged the formation. If a change in hydraulic pressure is cyclic, the change may indicate that one area of a drilling tool (e.g., drill) bit is more effective at cutting into a formation than another. If the change is relatively abrupt, processing system 706 may determine that the change is due to a formation change, as mentioned earlier, in such instances processing system 706 may use other measurements made by MWD system 702 (e.g., density, porosity, resistivity, rock strength, etc.) to verify such a conclusion.

At step 810, based on the determined cause of the change in hydraulic pressure, one or more changes may be made to the drilling process and/or the drill bit. For example, if it is determined that the cutting elements of the drill bit are sufficiently worn, the cutting elements or drill bit may be replaced. Further, changes in the formation may result in changes in drilling such as, but not limited to, drilling RPM, WOB, etc. Additionally, a determination of an amount of cutting element wear and engagement of secondary cutting elements may be used in conjunction with depth and formation information to better design drill bits.

Modifications, additions, or omissions may be made to method 800 without departing from the scope of the present disclosure. For example, one or more steps may be broken into more specific components, further one or more steps may be performed at the same time.

Although the present disclosure and its advantages have been described in detail, it should be understood that various changes, substitutions and alterations can be made herein without departing from the spirit and scope of the disclosure as defined by the following claims.

What is claimed is:

1. A method of determining a drilling parameter associated with a directional drilling system, comprising:
    measuring a hydraulic pressure used by a deflection mechanism of a directional drilling system to generate a deflection angle between a rotational axis of a drill bit and a longitudinal axis of a wellbore during drilling of the wellbore;
    detecting a change in the hydraulic pressure; and
    determining a drilling parameter based on the detected change in the hydraulic pressure.

2. The method of claim 1, wherein determining the drilling parameter further comprises determining cutting element wear based on a gradual change in the hydraulic pressure.

3. The method of claim 1, wherein determining the drilling parameter further comprises determining a formation change based on an abrupt change in the hydraulic pressure.

4. The method of claim 1, wherein determining the drilling parameter further comprises determining uneven cutting by a drilling tool based on a cyclic change in the hydraulic pressure.

5. The method of claim 1, wherein the directional drilling system comprises a point-the-bit directional drilling system.

6. The method of claim 1, further comprising measuring a formation characteristic and determining the drilling parameter based on the formation characteristic and the detected change in the hydraulic pressure.

7. The method of claim 1, further comprising adjusting drilling based on the determined drilling parameter.

8. The method of claim 1, further comprising designing a drilling tool based on the determined drilling parameter.

9. A directional drilling system comprising:
    a drilling tool including a drill bit;
    a steering mechanism including a deflection mechanism capable of generating a deflection angle between a rotational axis of the drill bit and a longitudinal axis of a wellbore using a hydraulic pressure, the steering mechanism configured to direct the drill bit in a desired trajectory using the hydraulic pressure;
    a hydraulic pressure sensor coupled to the steering mechanism and configured to measure the hydraulic pressure; and
    directional drilling equipment configured to:

receive the measured hydraulic pressure from the hydraulic pressure sensor;

detect a change in the measured hydraulic pressure; and determine a drilling parameter based on the detected change in the measured hydraulic pressure.

10. The directional drilling system of claim 9, wherein the drilling parameter comprises wear associated with a cutting element of the drilling tool.

11. The directional drilling system of claim 9, wherein the drilling parameter comprises a formation change.

12. The directional drilling system of claim 9, wherein the drilling parameter comprises uneven cutting by the drilling tool.

13. The directional drilling system of claim 9, further comprising a formation sensor configured to measure a formation characteristic, wherein the directional drilling equipment is further configured to:

receive the measured formation characteristic; and determine the drilling parameter based on the formation characteristic and the detected change in the measured hydraulic pressure.

14. The directional drilling system of claim 9, wherein the directional drilling equipment is further configured to adjust drilling based on the determined drilling parameter.

15. Directional drilling equipment comprising:

a processor;

a computer readable memory communicatively coupled to the processor; and processing instructions encoded in the computer readable memory, the processing instructions, when executed by the processor, operable to perform operations comprising:

receiving a hydraulic pressure measurement associated with a hydraulic pressure used by a deflection mechanism to generate a deflection angle between a rotational axis of a drill bit and a longitudinal axis of a wellbore;

detecting a change in the hydraulic pressure measurement; and determining a drilling parameter based on the detected change in the hydraulic pressure measurement.

16. The directional drilling equipment of claim 15, wherein determining the drilling parameter further comprises determining cutting element wear based on a gradual change in the hydraulic pressure measurement.

17. The directional drilling equipment of claim 15, wherein determining the drilling parameter further comprises determining a formation change based on an abrupt change in the hydraulic pressure measurement.

18. The directional drilling equipment of claim 15, wherein determining the drilling parameter further comprises determining uneven cutting by a drilling tool based on a cyclic change in the hydraulic pressure measurement.

19. The directional drilling equipment of claim 15, wherein the processing instructions, when executed by the processor, are further operable to perform operations comprising:

receiving a formation characteristic measurement; and determining the drilling parameter based on the formation characteristic measurement and the detected change in the hydraulic pressure measurement.

20. The directional drilling equipment of claim 15, wherein the processing instructions, when executed by the processor, are further operable to perform operations comprising adjusting drilling based on the determined drilling parameter.

* * * * *